(12) United States Patent
Nakajima et al.

(10) Patent No.: US 11,971,626 B2
(45) Date of Patent: Apr. 30, 2024

(54) BARRIER FILM, WAVELENGTH CONVERSION SHEET, BACK LIGHT, AND DISPLAY DEVICE

(71) Applicant: DAI NIPPON PRINTING CO., LTD., Tokyo (JP)

(72) Inventors: Tatsuji Nakajima, Abiko (JP); Shuichi Tamura, Misato (JP); Takeshi Sakamoto, Fujimino (JP); Ryutaro Harada, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/907,435

(22) PCT Filed: Mar. 24, 2021

(86) PCT No.: PCT/JP2021/012117
§ 371 (c)(1),
(2) Date: Jan. 5, 2023

(87) PCT Pub. No.: WO2021/200426
PCT Pub. Date: Oct. 7, 2021

(65) Prior Publication Data
US 2023/0121133 A1  Apr. 20, 2023

(30) Foreign Application Priority Data
Mar. 31, 2020  (JP) ................. 2020-065321

(51) Int. Cl.
*G02F 1/1335* (2006.01)
*B32B 27/40* (2006.01)
*G02F 1/13357* (2006.01)

(52) U.S. Cl.
CPC ........ *G02F 1/133614* (2021.01); *B32B 27/40* (2013.01); *G02F 1/133606* (2013.01)

(58) Field of Classification Search
CPC ......... G02F 1/133614; G02F 1/133606; B32B 27/40; C08J 2475/06; C08J 7/043;
(Continued)

(56) References Cited

U.S. PATENT DOCUMENTS

| | | | |
|---|---|---|---|
| 2016/0195229 A1* | 7/2016 | Tokinoya | G02F 1/133603 362/351 |
| 2021/0301097 A1* | 9/2021 | Murata | B05D 5/06 |
| 2023/0299305 A1* | 9/2023 | Ochiai | H01G 11/50 429/100 |

FOREIGN PATENT DOCUMENTS

| | | |
|---|---|---|
| JP | 2008-184522 | 8/2008 |
| JP | 2018-013724 | 1/2018 |

(Continued)

OTHER PUBLICATIONS

International Search Report of PCT/JP2021/012117, dated Jun. 15, 2021, 5 pages including English translation.

*Primary Examiner* — Mariam Qureshi
(74) *Attorney, Agent, or Firm* — Hamre, Schumann, Mueller & Larson, P.C.

(57) ABSTRACT

Provided are a barrier film having superior close adhesion to a phosphor layer when used for a wavelength conversion sheet, a wavelength conversion sheet having the barrier film, and a backlight and a display device including the wavelength conversion sheet. A barrier film for a wavelength conversion sheet, comprising: a barrier layer; and a primer layer, wherein the primer layer comprises a cured product of a polyurethane-based resin composition, and when a surface of an opposite side of the primer layer from the barrier layer is subjected to X-ray photoelectron spectroscopy to obtain a C1s spectrum, P2/P1 is 0.55 or more, where P1 is an area of a peak assigned to a C—C bond in the C1s spectrum and P2 is an area of a peak assigned to a C—O bond in the C1s spectrum.

12 Claims, 5 Drawing Sheets

(58) Field of Classification Search
CPC ........... C08J 7/048; C08J 7/0423; G02B 1/14; G02B 5/20; C23C 14/081
See application file for complete search history.

(56) References Cited

FOREIGN PATENT DOCUMENTS

| | | |
|---|---|---|
| JP | 2019-044136 | 3/2019 |
| JP | 2019-126924 | 8/2019 |
| WO | 2015/037733 | 3/2015 |

\* cited by examiner

BARRIER FILM, WAVELENGTH CONVERSION SHEET, BACK LIGHT, AND DISPLAY DEVICE

TECHNICAL FIELD

The present disclosure relates to a barrier film used for a wavelength conversion sheet, a wavelength conversion sheet having the barrier film, and a backlight and a display device including the wavelength conversion sheet.

BACKGROUND ART

In recent years, with the development of a personal computer, particularly the development of a portable personal computer, the demand for a liquid crystal display device has been increasing. In addition, recently, the penetration rate of a home-use liquid crystal television has also been increasing, and a smartphone and a tablet terminal have also been becoming widespread. Thus the market for a liquid crystal display device is in an expanding situation.

Such a liquid crystal display device generally has a liquid crystal cell unit having a color filter, opposed substrates, and a liquid crystal layer sandwiched between these, and further has a light source referred to as a backlight unit.

Recently, the development of a backlight member using quantum dot technology has also been promoted. The quantum dot refers to a nanometer-sized fine particle of a semiconductor. The quantum dot can be adjusted over the entire visible region of the emission wavelength by the quantum confinement effect (quantum size effect), in which an electron or an exciton is confined in a nanometer-sized small crystal. The quantum dot can generate strong fluorescence in a narrow wavelength band, and thus the display device can be illuminated with light of the three primary colors having excellent color purity. Therefore, a backlight using a quantum dot can provide a display device having excellent color reproducibility.

The wavelength conversion sheet used for the backlight source of this display device has a structure which has a phosphor layer obtained by dispersing a nanometer-sized phosphor fine particle of a semiconductor in a resin layer, and a barrier film having a water vapor barrier property laminated on a surface of the phosphor layer in order to suppress degradation of the phosphor layer, in combination with an LED light source.

For example, a wavelength conversion sheet obtained by laminating a barrier film on a phosphor layer containing a phosphor, and a backlight unit including the wavelength conversion sheet have been developed, wherein the barrier film is obtained by laminating a barrier layer on one surface of a predetermined polyethylene terephthalate film (PTL 1).

An attempt has been made to improve the close adhesion between the phosphor layer and the barrier film in order to further suppress the invasion of the phosphor layer by water vapor. For example, PTL 1 and PTL 2 each disclose a barrier film having excellent close adhesion to a phosphor layer even in a high temperature and high humidity environment by using a primer layer including a polyurethane-based resin composition.

CITATION LIST

Patent Literature

PTL1: WO 2015/037733
PTL2: JP 2018-13724 A
PTL3: JP 2019-126924 A

SUMMARY OF INVENTION

Technical Problem

However, among the barrier films having a primer layer including a polyurethane-based resin composition, some of them may be superior or inferior to others in the degree of suppression of degradation of the phosphor layer.

The present disclosure has been made in view of the above problem, and it is an object of the present disclosure to provide a barrier film having superior close adhesion to a phosphor layer when used for a wavelength conversion sheet, a wavelength conversion sheet having the barrier film, and a backlight and a display device including the wavelength conversion sheet.

Solution to Problem

The present inventors have focused on a C is spectrum obtained by subjecting a surface of the primer layer that comes into contact with the phosphor layer to X-ray photoelectron spectroscopy. As a result, the present inventors have found that when the value of the area of a peak assigned to a C—O bond relative to the area of a peak assigned to a C—C bond is more than or equal to a predetermined value, the close adhesion between the primer layer and the phosphor layer is dramatically improved, and completed the present disclosure.

That is, in order to solve the above problem, the present disclosure provides the following [1] to [6].

[1] A barrier film for a wavelength conversion sheet, comprising: a barrier layer; and a primer layer, wherein the primer layer comprises a cured product of a polyurethane-based resin composition, and when a surface of an opposite side of the primer layer from the barrier layer is subjected to X-ray photoelectron spectroscopy to obtain a C1s spectrum, P2/P1 is 0.55 or more, where P1 is an area of a peak assigned to a C—C bond in the C1s spectrum and P2 is an area of a peak assigned to a C—O bond in the C is spectrum.

[2] The barrier film according to [1], wherein the barrier layer is formed on a base material layer, and the primer layer is formed on a surface of an opposite side of the barrier layer from the base material layer.

[3] The barrier film according to [1] or [2], wherein the barrier layer comprises an inorganic oxide thin film layer and an organic coating layer, and the organic coating layer is in contact with the primer layer.

[4] A wavelength conversion sheet, wherein the barrier film according to any one of [1] to [3] is provided on at least one surface side of a phosphor layer comprising a phosphor such that the primer layer and the phosphor layer are in contact with each other.

[5] A backlight comprising: at least one light source that emits primary light; an optical plate that is disposed adjacent to the light source and is for light guiding or diffusion; and a wavelength conversion sheet disposed on a light emission side of the optical plate, wherein the wavelength conversion sheet is the wavelength conversion sheet according to any one of [1] to [4].

[6] A liquid crystal display device comprising: a backlight; and a liquid crystal panel, wherein the backlight is the backlight according to claim 5.

Advantageous Effects of Invention

According to the present disclosure, it is possible to obtain a barrier film having superior close adhesion to the phosphor layer when used for a wavelength conversion sheet. In addition, according to the present disclosure, it is possible to obtain a wavelength conversion sheet that has excellent close adhesion between the primer layer and the phosphor layer and can suppress degradation of the phosphor layer due to the invasion thereof by oxygen and water vapor, and a backlight and a display device including the wavelength conversion sheet.

DESCRIPTION OF EMBODIMENTS

Hereinafter, the barrier film of the present disclosure will be described in detail. As used herein, the notation of the numerical range "AA to BB" means "AA or more and BB or less."

[Barrier Film]

The barrier film is a barrier film for a wavelength conversion sheet, including a phosphor layer including a phosphor. The barrier film is provided in order to prevent oxygen and water vapor from reaching the phosphor layer from the external environment and causing degradation of the phosphor layer.

The barrier film according to the present disclosure has a barrier layer and a primer layer, wherein the primer layer contains a cured product of a polyurethane-based resin composition, and when a surface of the opposite side of the primer layer from the barrier layer is subjected to X-ray photoelectron spectroscopy to obtain a C1s spectrum, P2/P1 is 0.55 or more, where P1 is the area of a peak assigned to a C—C bond in the C is spectrum and P2 is the area of a peak assigned to a C—O bond in the C1s spectrum.

Figure 1:
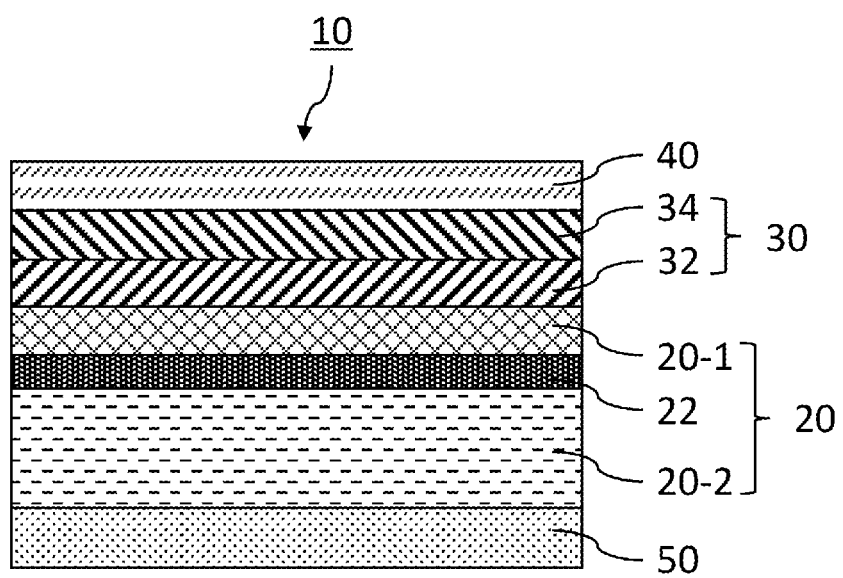
FIG. 1 is a cross-sectional schematic view schematically illustrating one embodiment of the barrier film of the present disclosure.

FIG. 1 is a cross-sectional schematic view schematically illustrating one embodiment of the barrier film of the present disclosure. A barrier film 10 has a barrier layer 30 and a primer layer 40 on a base material layer 20. As shown in FIG. 1, preferably, the barrier layer 30 is formed on the base material layer 20, and the primer layer 40 is formed on the surface of the opposite side of the barrier layer 30 from the base material layer 20. As shown in FIG. 1, a diffusion layer 50 may be provided on the surface of the opposite side of the base material layer 20 from the surface on which the barrier layer 30 is formed.

The barrier film preferably has a high total light transmittance measured according to JIS K 7361-1:1997, in view of efficiently converting light from a light source when used for a wavelength conversion sheet. Specifically, the barrier film has a total light transmittance of preferably 85% or more, more preferably 90% or more, as measured according to JIS K 7361-1:1997.

The barrier film preferably has a value of oxygen transmission rate according to JIS K 7126-2:2006 of 5 cc/m²·day·atm or less (23° C., 90% RH). In addition, the barrier film preferably has a value of water vapor transmission rate according to JIS K 7129:2008 Method B of 5 g/m²·day·atm or less (40° C., 90% RH). The oxygen transmission rate can be measured, for example, using an oxygen transmission rate measuring apparatus, "OX-TRAN," manufactured by MOCON, Inc. (MOCON method). The water vapor barrier property can be measured, for example, using a water vapor transmission rate measuring apparatus, "PERMATRAN," manufactured by MOCON, Inc.

Hereinafter, each layer of the barrier film will be described.

[Base Material Layer]

The base material layer mainly plays the role of a support for the barrier layer and the primer layer. The base material layer is preferably one having a high light-transmitting property. Specifically, the base material layer has a total light transmittance of preferably 85% or more, more preferably 90% or more, as measured according to JIS K 7361-1:1997.

The material of the base material layer is not particularly limited as long as it is a resin film that does not impair the function of the wavelength conversion sheet. Examples of the base material layer include a resin such as polyimide (PI), polyethylene naphthalate (PEN), polyethylene terephthalate (PET), polyethylene butyrate (PBT), an amorphous polyarylate, polysulfone, polyethersulfone, polyetherimide, fluororesin, or a liquid crystal polymer. It is preferable to use polyethylene naphthalate (PEN) or polyethylene terephthalate (PET) as the base material layer, in view of transparency, heat resistance, or the like.

The base material layer may be a resin film consisting of a single layer, or a plurality of resin films adhered via an adhesion layer. In the example shown in FIG. 1, in the base material layer 20, a first base material 20-1 and a second base material 20-2 are adhered to each other via an adhesion layer 22. In this case, the first base material 20-1 serves as a support for forming the barrier layer 30 and the primer layer 40. The second base material 20-2 plays the role of increasing the thickness of the entire base material layer 20 to impart rigidity to the barrier film 10.

The thickness of the base material layer is not particularly limited, and is preferably 8 µm or more and 200 µm or less, and more preferably 8 µm or more and 150 µm or less. In particular, when the barrier film is produced by a winding method, the thickness of the base material layer is preferably 8 µm or more and 125 µm or less. When the base material layer has the above thickness, it is easy to produce the barrier film by the winding method, and when the barrier film is used for a wavelength conversion sheet, it is possible to reduce the invasion by water vapor and oxygen from an edge portion of the base material layer.

When the base material layer is composed of a plurality of resin films, the thickness of the first base material serving as a support for the barrier layer and the primer layer is preferably 8 µm or more and 50 µm or less, more preferably 8 µm or more and 25 µm or less, and further preferably 8 µm or more and 20 µm or less. When the first base material has the above thickness, the handleability is good when the barrier layer and the primer layer are produced by the winding method. The thickness of the second base material is preferably 8 µm or more and 150 µm or less, and more preferably 8 µm or more and 100 µm or less. With the above thickness, it is possible to impart appropriate rigidity to the barrier film. Further, when the barrier film is produced by the winding method, the handleability is good.

The adhesive constituting the adhesion layer 22 is not particularly limited as long as it satisfies the good adhesiveness between the base material layers and the optical performance required for the barrier film and the wavelength conversion sheet. Examples of the adhesive that can be used include a polyvinyl acetate-based adhesive, a polyacrylic acid ester-based adhesive made of, for example, a homopolymer of an ethyl, butyl, or 2-ethylhexyl ester of acrylic acid or the like, or a copolymer of any of these with methyl methacrylate, acrylonitrile, styrene, or the like, a cyano acrylate-based adhesive, an ethylene copolymer-based adhesive made of, for example, a copolymer of ethylene with a monomer such as vinyl acetate, ethyl acrylate, acrylic acid, or methacrylic acid, a cellulose-based adhesive, a polyester-based adhesive, a polyamide-based adhesive, a polyimide-based adhesive, an amino resin-based adhesive made of a urea resin, a melamine resin, or the like, a phenol resin-based adhesive, an epoxy-based adhesive, a polyurethane-based adhesive, a reactive (meth)acrylic-based adhesive, a rubber-based adhesive made of chloroprene rubber, nitrile rubber, styrene-butadiene rubber, or the like, a silicone-based adhesive, and an inorganic adhesive made of an alkali metal silicate, a low melting point glass, or the like. The composition system of the adhesive constituting the adhesive layer may be any composition form of an aqueous type, a solution type, an emulsion type, a dispersion type, and the like, and the form thereof may be any form of a film form, a sheet form, a powder form, a solid form, and the like, and further, the adhesion mechanism may be any form of a chemical reaction type, a solvent volatilization type, a hot-melt type, a hot-press type, and the like.

Instead of the above adhesive, an adhesion layer may be formed, for example, using a thermosetting resin or a resin obtained by containing a crosslinking agent or the like in a thermoplastic resin. Alternatively, the adhesion layer may be formed by extruding a thermoplastic resin such as EVA, an ionomer, polyvinyl butyral (PVB), or a polyethylene-based resin between base materials by extrusion lamination.

A desired surface treatment may be applied in advance to the surface of the side of the base material layer where the barrier layer is provided, in order to improve the close adhesion to the barrier layer or the like. Examples of the surface treatment include corona discharge treatment, ozone treatment, low temperature plasma treatment using oxygen gas, nitrogen gas, or the like, glow discharge treatment, and oxidation treatment using a chemical or the like.

As a method for improving the close adhesion to the barrier layer, an underlying layer such as an anchor coating agent layer or an adhesive layer may be formed in advance.

As the underlying layer, a resin composition containing a polyester-based resin, a polyamide-based resin, a polyurethane-based resin, an epoxy-based resin, a phenol-based resin, a (meth)acrylic-based resin, a polyvinyl acetate-based resin, a polyolefin-based resin such as polyethylene or polypropylene or a copolymer or a modified resin thereof, a cellulose-based resin, or the like as the main component of the vehicle can be used.

[Barrier Layer]

The barrier layer is a layer that imparts a gas barrier property to the barrier film.

In the example shown in FIG. 1, the barrier layer 30 is configured by laminating an inorganic oxide thin film layer 32 and an organic coating layer 34 in the order presented, from the base material layer 20 side. The barrier layer is not limited to the laminated configuration shown in FIG. 1, and may be an organic coating layer or an inorganic oxide thin film layer formed in a single layer, or a layer such that two or more layers in total of an inorganic oxide thin film layer and an organic coating layer are laminated alternately. The inorganic oxide thin film layer and the organic coating layer may each be a single layer or a plurality of layers laminated.

<Inorganic Oxide Thin Film Layer>

Examples of the inorganic oxide thin film layer include a layer made of aluminum oxide, silicon oxide, magnesium oxide, or a mixture thereof. The inorganic oxide thin film layer is preferably a thin film layer containing aluminum oxide or silicon oxide as a main component, in view of a sufficient gas barrier property, transparency, productivity, or the like.

The method for forming the inorganic oxide thin film layer may be a method for forming the same by vapor-depositing an inorganic oxide. Examples of the method for forming a vapor-deposited film include a physical vapor deposition method (PVD method) such as a vacuum vapor deposition method, a sputtering method, and an ion plating method, or a chemical vapor deposition method (CVD method) such as a plasma chemical vapor deposition method, a thermochemical vapor deposition method, and a photochemical vapor deposition method.

The thickness of the inorganic oxide thin film layer is not particularly limited, and is preferably 5 nm or more and 500 nm or less. When the thickness of the inorganic oxide thin film layer is 5 nm or more, the inorganic oxide thin film layer becomes uniform, and a sufficient gas barrier property can be imparted to the barrier film. The thickness of the inorganic oxide thin film layer is more preferably 8 nm or more and further preferably 10 nm or more, in consideration of the gas barrier property. When the thickness of the inorganic oxide thin film layer is 500 nm or less, sufficient flexibility can be imparted to the inorganic oxide thin film layer, and it is possible to reduce the occurrence of a scratch and a crack in each inorganic oxide thin film layer. The thickness of the inorganic oxide thin film layer is more preferably 100 nm or less, further preferably 50 nm or less, and particularly preferably 20 nm or less, in consideration of transparency, productivity, and the like. When a plurality of inorganic oxide thin film layers are provided, the thickness of each inorganic oxide thin film layer is preferably in the above thickness range.

<Organic Coating Layer>

The organic coating layer is a layer that prevents various types of secondary damage in a subsequent step and imparts a high gas barrier property to the barrier film. By locating the inorganic oxide thin film layer between the base material layer and the organic coating layer, the occurrence of a scratch or a crack in the inorganic oxide thin film layer can be reduced. By providing the organic coating layer in contact with the primer layer, the close adhesion between the primer layer and the barrier layer of the present disclosure can be improved.

For example, using a gas barrier composition including a water-soluble polymer and an aqueous solution or a water/alcohol mixed solution including at least one of one or more metal alkoxides and hydrolysates or tin chloride as a coating liquid, the organic coating layer is formed by applying the coating liquid. The organic coating layer preferably contains at least one selected from the group consisting of a hydroxyl group-containing polymer compound, a metal alkoxide, a metal alkoxide hydrolysate, and a metal alkoxide polymer as a component. Examples of the water-soluble polymer used for the organic coating layer include polyvinyl alcohol, polyvinylpyrrolidone, and an ethylene-vinyl alcohol copolymer. In particular, when polyvinyl alcohol and/or an ethylene-vinyl alcohol copolymer is used, an excellent gas barrier property can be obtained. The content of the polyvinyl alcohol-based resin and/or the ethylene-vinyl alcohol copolymer is preferably in the range of 5 parts by mass or more and 500 parts by mass or less, and more preferably in the range of 20 parts by mass or more and 200 parts by mass or less, per 100 parts by mass in total of the above alkoxides.

A silane coupling agent or the like can also be added to the gas barrier composition. As the silane coupling agent, a known organic reactive group-containing organoalkoxysilane can be used. In the present disclosure, an organoalkoxysilane having an epoxy group is particularly preferable, and examples thereof that can be used include γ-glycidoxypropyltrimethoxysilane, γ-glycidoxypropylmethyldiethoxysilane, or β-(3,4-epoxycyclohexyl)ethyltrimethoxysilane. Such silane coupling agents may be used singly or as a mixture of two or more. In the present disclosure, the amount of such a silane coupling agent used is preferably 1 part by mass or more and 20 parts by mass or less per 100 parts by mass of the above alkoxysilane.

The thickness of the organic coating layer is not particularly limited, and is preferably 100 nm or more and 500 nm or less. When the thickness of the organic coating layer is 100 nm or more, a sufficient gas barrier property can be imparted to the barrier film. The thickness of the organic coating layer is more preferably 120 nm or more, and further preferably 150 nm or more, in consideration of the gas barrier property. When the thickness of the organic coating layer is 500 nm or less, sufficient transparency can be ensured. The thickness of the organic coating layer is more preferably 300 nm or less, and further preferably 200 nm or less, in consideration of transparency, productivity, or the like. When a plurality of organic coating layers are provided, the thickness of each organic coating layer is preferably in the above thickness range.

In the present disclosure, the total light transmittance measured according to JIS K 7361-1:1997 is preferably high. Specifically, the total light transmittance measured according to JIS K 7361-1:1997 when a barrier layer is formed on a PET film (thickness: 12 μm) is preferably 85% or more, and more preferably 90% or more. When the total light transmittance is in the above range, light of a light source can be efficiently converted when the barrier film is used for a wavelength conversion sheet.

In the present disclosure, the value of oxygen transmission rate according to JIS K 7129-2:2006 when a barrier layer is formed on a PET film (thickness: 12 μm) is preferably 5 cc/m$^2$·day·atm or less (23° C., 90% RH), and more preferably 2 cc/m$^2$·day·atm or less. The value of water vapor transmission rate according to JIS K 7129:2008 Method B when a barrier layer is formed on a PET film (thickness: 12 μm) is preferably 5 g/m$^2$·day·atm or less (40° C., 90% RH), and more preferably 2 g/m$^2$·day·atm or less.

[Primer Layer]

The primer layer plays the role of ensuring good close adhesion to the phosphor layer when used for a wavelength conversion sheet to prevent the separation between the barrier film and the phosphor layer even in a high temperature and high humidity environment and prevent degradation of the phosphor layer.

In the present disclosure, the primer layer contains a cured product of a polyurethane-based resin composition. When a C—N bond is detected by X-ray photoelectron spectroscopy (XPS), infrared spectroscopy (IR), nuclear magnetic resonance (NMR), gas chromatography-mass spectrometry (GCMS), or the like, it can be determined that the primer layer includes a polyurethane-based resin composition.

In the present disclosure, when a surface of the opposite side of the primer layer from the barrier layer is subjected to X-ray photoelectron spectroscopy (hereinafter, sometimes simply referred to as "XPS") to obtain a C1s spectrum, P2/P1 is 0.55 or more, where P1 is the area of a peak assigned to a C—C bond in the C1s spectrum and P2 is the area of a peak assigned to a C—O bond in the C1s spectrum. The surface of the opposite side of the primer layer from the barrier layer serves as a surface that comes into contact with the phosphor layer when used for a wavelength conversion sheet.

When the surface of the primer layer (surface that comes into contact with the phosphor layer) in the barrier film of the present disclosure is analyzed by XPS, a peak assigned to a C—C bond, a peak assigned to a C—O bond, and a peak assigned to a O—C=O bond (carboxyl group) are observed in the resulting C1s spectrum.

Because the primer layer includes a polyurethane-based resin composition, a peak assigned to a C—N bond can also be observed in the C1s spectrum. However, in the C1s spectrum, the binding energy of the C—N bond (285.2 to 288.5 eV) and the binding energy of the C—O bond (286.0 to 286.8 eV) are close to each other. For the primer layer of the present disclosure, the content of the C—N bond on the surface of the primer layer calculated using an N1s spectrum (proportion of the C—N bond to all the bonds constituting the primer layer) is about 1.1% to 2.3%, whereas the content of the C—O bond calculated using a C1s spectrum is 18.8 to 31.1%. Namely, the content of the C—N and in the primer layer is very small and negligible as compared with the content of the C—O bond, and thus the influence of the peak assigned to the C—N bond can be ignored in the C1s spectrum. In other words, it can be considered that in the C1s spectrum, the peak appearing near 285 to 287 eV is assigned to the C—O bond.

With a P2/P1 of 0.55 or more, when the phosphor layer and the primer layer of the barrier film are contacted with each other and laminated to form a wavelength conversion sheet, the close adhesion between the phosphor layer and the barrier film is dramatically improved.

The reason for this is unclear, but it is considered that a chemically bonded state on the surface of the primer layer is involved. The C—O bind signal detected by XPS analysis is mainly assigned to a terminal C—OH group. In other words, a large value of P2/P1 means that there are many OH groups on the surface of the primer layer. It is considered that when a wavelength conversion sheet is formed, an OH group on the surface of the primer layer is bonded to a functional group (for example, NCO group) of a sealing resin of the phosphor layer. Therefore, it is considered that one factor behind the improvement in the close adhesion between the barrier film and the phosphor layer is that P2/P1 is 0.55 or more, indicating that the primer layer has many C—O bonds on the surface (that is, the primer layer has many OH groups on the surface). P2/P1 is preferably 0.65 or more, more preferably 0.80 or more, and further preferably 0.90 or more. If P2/P1 is too large, the close adhesion between the barrier film and the phosphor layer may decrease. In addition, if P2/P1 is too large, moisture is easily adsorbed on the surface of the primer layer, and many C—OH groups that do not contribute to the bonding to a functional group of the sealing resin of the phosphor layer easily remain. Because of the influence of the adsorbed moisture and the remaining C—OH groups, the close adhesion between the barrier film and the phosphor layer may decrease, and the degradation of the phosphor may easily proceed in the vicinity of the interface with the primer layer. Therefore, P2/P1 is preferably 1.0 or less.

When the area of a peak assigned to a O—C=O bond in the C1s spectrum is designated as P3, the ratio of P3 to the sum of P1, P2, and P3 is preferably 0.05 or more, and more preferably 0.08 or more. When the ratio of P3 is in the above range, the durability of the barrier film can be improved, and then, the durability of the wavelength conversion sheet can be improved. The ratio of P3 is preferably 0.40 or less, and more preferably 0.30 or less, in consideration of the close adhesion between the phosphor layer and the barrier film.

The polyurethane-based resin composition include a one-pack or two-pack polyurethane-based resin composition obtained by reacting a polyfunctional isocyanate with a hydroxyl group-containing compound. Only one of each of the polyfunctional isocyanate and the hydroxyl group-containing compound may be used, or a plurality of each thereof may be used.

Specific examples of the polyfunctional isocyanate include an aromatic polyisocyanate such as tolylene diisocyanate, diphenylmethane diisocyanate, xylylene diisocyanate, or polymethylene polyphenylene polyisocyanate, and an aliphatic polyisocyanate such as hexamethylene diisocyanate or isophorone diisocyanate.

Examples of the hydroxyl group-containing compound include a polyether polyol, a polyester polyol, a polyester polyurethane polyol, and a polyacrylate polyol. In the present disclosure, a polyester polyurethane polyol is particularly preferable in view of close adhesion to the phosphor layer and durability. The polyester polyurethane polyol can be produced, for example, by the method described in JP 2001-288408 A or JP 2003-26996 A.

In the present disclosure, the value of P2/P1 can be adjusted by changing components constituting the primer layer and the content thereof. Specifically, the higher the ratio of a hydroxyl group in the polyurethane-based resin composition, the larger P2/P1 on the surface of the primer layer.

The ratio of a hydroxyl group in the polyurethane-based resin composition can be adjusted by changing the hydroxyl value of the hydroxyl group-containing compound, the NCO/OH ratio in the polyurethane-based resin composition, the molecular weight of the polyurethane-based resin composition, or the like. In particular, the value of P2/P1 can be adjusted to an appropriate range to improve the close adhesion, by setting the NCO/OH ratio in a predetermined range while setting the hydroxyl value in an appropriate range.

The hydroxyl value of the hydroxyl group-containing compound is preferably 40 mgKOH/g or more, and more preferably 42 mgKOH/g or more. P2/P1 can be easily set to 0.55 or more by using a hydroxyl group-containing compound having the above hydroxyl value.

The NCO/OH ratio of the polyurethane-based resin composition is preferably 1.1 or more, and more preferably 1.2 or more. The NCO/OH ratio of the polyurethane-based resin composition is preferably 3.0 or less, and more preferably 2.0 or less. P2/P1 can be easily set to 0.55 or more by setting the NCO/OH ratio in the above range.

The smaller the molecular weight of the polyurethane-based resin composition, the relatively higher the ratio of a hydroxyl group in the polyurethane-based resin composition, which making it easier to set P2/P1 in the above range, though it depends on the types of a polyfunctional isocyanate and a hydroxyl group-containing compound used in the production of the polyurethane-based resin composition.

The molecular weight (weight average molecular weight) of the polyurethane-based resin composition is preferably 1,000 or more and 100,000 or less.

In the present disclosure, P2/P1 value may be further adjusted by subjecting the surface of the primer layer (surface that comes into contact with the phosphor layer described later) to a surface treatment such as corona discharge treatment, ozone treatment, low temperature plasma treatment using oxygen gas, nitrogen gas, or the like, glow discharge treatment, or oxidation treatment using a chemical or the like, after the primer layer is formed.

The polyurethane-based resin composition is contained in an amount of preferably 40% by mass or more, and more preferably 70% by mass or more, based on the total amount of the primer layer. By containing the polyurethane-based resin composition in an amount of 40% by mass or more, the close adhesion between the primer layer and the phosphor layer can be improved.

In the present disclosure, the primer layer may further contain a silane coupling agent. By containing a silane coupling agent, the close adhesion between the primer layer and the barrier layer (particularly the organic coating layer) can be improved. In the silane coupling agent, a functional group present at one end of the molecule thereof, usually a chloro, alkoxy, acetoxy group or the like, is hydrolyzed to form a silanol group (Si—OH), whereby the resin composition of the primer layer is modified by a covalent bond or the like to form a strong bond. In addition, an organic functional group, such as vinyl, methacryloxy, amino-based, epoxy-based, or mercapto, present at the other end of the silane coupling agent can improve the close adhesion between the barrier layer and the primer layer and between the primer layer and the phosphor layer.

As the silane coupling agent, an organofunctional silane monomer having binary reactivity can be used, and, for example, one or more of aqueous solutions can be used, the aqueous solution including γ-chloropropyltrimethoxysilane, vinyltrichlorosilane, vinyltriethoxysilane, vinyl-tris(β-methoxyethoxy)silane, γ-methacryloxypropyltrimethoxysilane, β-(3,4-epoxycyclohexyl)ethyltrimethoxysilane, γ-glycidoxypropyltrimethoxysilane, vinyltriacetoxysilane, γ-mercaptopropyltrimethoxysilane, N-β(aminoethyl)-γ-aminopropyltrimethoxysilane, N-β(aminoethyl)-γ-aminopropylmethyldimethoxysilane, γ-ureidopropyltriethoxysilane, bis(β-hydroxyethyl)-γ-aminopropyltriethoxysilane, γ-aminopropylsilicone, or the like.

The silane coupling agent is contained in an amount of preferably 1% by mass or more, and more preferably 3% by mass or more, based on the total amount of the primer layer. When the content of the silane coupling agent is in the above range, the close adhesion between the barrier layer and the primer layer and the close adhesion between the primer layer and the phosphor layer can be further improved. In view of improving the extensibility of the primer layer and suppressing the occurrence of a crack in the primer layer, the silane coupling agent is contained in an amount of preferably 30% by mass or less, and more preferably 20% by mass or less, based on the total amount of the primer layer.

In the present disclosure, the primer layer may further include a filler. The filler has the role of adjusting the viscosity or the like of a coating liquid for forming a primer layer to improve the coating suitability or the like. As the filler, for example, calcium carbonate, barium sulfate, alumina white, silica, talc, a glass frit, or a resin powder can be used.

The primer layer may further include an additive such as a stabilizer, a crosslinking agent, a lubricant, or an ultraviolet absorber, as necessary.

The thickness of the primer layer is not particularly limited, and is preferably 0.05 µm or more, and more preferably 0.1 µm or more. The thickness of the primer layer is preferably 10 µm or less, and more preferably 3 µm or less, in view of handleability, productivity, and the like.

The primer layer according to the present embodiment preferably has a high total light transmittance measured according to JIS K 7361-1:1997, in view of efficiently converting light from a light source. Specifically, the primer layer according to the present embodiment has a total light transmittance of preferably 85% or more, and more preferably 90% or more, as measured according to JIS K 7361-1:1997, when the primer layer is formed on a PET film (film thickness: 12 µm).

[Diffusion Layer]

The diffusion layer is a layer provided for the purpose of reducing the anisotropy of the light exit angle distribution and preventing sticking, and is a layer optionally provided in the present disclosure.

The diffusion layer includes a binder resin and a filler. The filler itself is embedded in the binder resin, and at least a part of the filler is exposed from the binder resin to the surface side of the layer to give an uneven shape to the surface of the diffusion layer, whereby the effect of reducing the anisotropy of the light exit angle distribution is exhibited.

Further, because the surface of the diffusion layer has an uneven shape, it has the role of preventing sticking even if barrier films or wavelength conversion sheets come into contact with each other in the production process of the barrier films or the wavelength conversion sheets. For example, when a barrier film or a wavelength conversion sheet is produced by a winding method, the barrier film or the wavelength conversion sheet can be easily handled and a surface scratch can be suppressed. In addition, when the diffusion layer is used for a display device, the diffusion layer also has the role of preventing the sticking between the light guide plate or the diffusing plate and the wavelength conversion sheet, and also exhibits the effect of suppressing the occurrence of a scratch due to rubbing between the light guide plate or the diffusing plate and the wavelength conversion sheet to reduce the occurrence of poor appearance of the display device.

The binder resin of the diffusion layer is not particularly limited as long as it meets the specifications required for the barrier film and the wavelength conversion sheet. Examples of thereof that can be used include an acrylic-based resin, an epoxy resin, a urethane resin, a polyester-based resin, a polyester acrylate-based resin, a polyurethane acrylate-based resin, an acrylic urethane-based resin, and an epoxy acrylate-based resin. The binder resin is preferably an acrylic-based resin in view of having high hardness.

The filler is preferably a resin filler in view of the optical performance required for the barrier film and the wavelength conversion sheet. Examples of the resin used for the filler include an acrylic-based resin and a polystyrene-based resin. An acrylic-based resin filler is particularly preferable in view of improving the scratch resistance of the diffusion layer. The acrylic-based resin here is a polymer including an ethylenically unsaturated monomer having at least one carboxyl group or carboxylic acid ester group selected from the group consisting of methacrylic acid, acrylic acid, a methacrylic acid ester, and an acrylic acid ester as a monomer component.

The difference in refractive index between the refractive index of the filler and the refractive index of the resin binder is preferably 0.5 or less, more preferably 0.3 or less, and further preferably 0.1 or less.

The average particle size of the filler is preferably 1 µm or more and 50 µm or less, and more preferably 1.5 µm or more and 10 µm or less. When the average particle size of the filler is 1 µm or more, at least a part of the filler is exposed more from the surface of the diffusion layer, which can give appropriate light diffusivity and suppress sticking more effectively. When the average particle size of the filler is 50 µm or less, the filler is less likely to be detached from the diffusion layer, and it is possible to suppress functional deterioration of the diffusion layer and a scratch caused by the detached filler.

The average particle size can be measured, for example, by a dynamic light scattering method, a laser diffraction scattering method, or SEM or TEM observation. Alternatively, the average particle size can also be, for example, a particle size obtained as the value of D50 in a particle size distribution measurement according to JIS Z 8820 and JIS Z 8822.

The content of the filler is preferably 5% by mass or more and 50% by mass or less, and more preferably 10% by mass or more and 40% by mass or less, based on the total amount of the diffusion layer. When the content thereof is 5% by mass or more, it is possible to provide appropriate light diffusivity and effectively prevent sticking. When the content thereof is 50% by mass or less, it is easy to satisfy the optical characteristics required for the barrier film and the wavelength conversion sheet, and further, it is possible to improve the film forming property of the diffusion layer.

The diffusion layer may optionally include an additive such as a stabilizer, a curing agent, a crosslinking agent, a lubricant, or an ultraviolet absorber, as necessary.

The thickness of the diffusion layer is not particularly limited, and can be appropriately set according to the average particle size of the filler, the specifications required for the barrier film and the wavelength conversion sheet, or the like. For example, the thickness of the diffusion layer is preferably 1.0 µm or more and 50.0 µm or less, and more preferably 1.5 µm or more and 10.0 µm or less. The thickness of the diffusion layer means the thickness of the resin portion other than the filler in the diffusion layer, and does not include that of a portion of the filler projecting on the resin. The thickness of a diffusion prevention layer can be measured, for example, by observing a cross section using a scanning electron microscope or the like.

[Method for Producing Barrier Film]

The method for producing the barrier film of the present disclosure includes at least (1) a barrier layer formation step and (2) a primer layer formation step.

(1) Barrier Layer Formation Step

An organic coating layer and/or an inorganic oxide thin film layer is laminated as a barrier layer on one surface of a base material layer (or a first base material). When an organic coating layer and an inorganic oxide thin film layer are used as a barrier layer, an inorganic oxide thin film layer is first formed on a base material layer (or a first base material), and then an organic coating layer is formed on the inorganic oxide thin film layer.

The surface of the base material layer (or the first base material) on which the barrier layer is formed may be subjected to the above surface treatment in advance, or on the surface thereof, an underlying layer may be formed.

The inorganic oxide thin film layer can be formed by vapor-depositing an inorganic oxide. Examples of the method for vapor-depositing an inorganic oxide include a physical vapor deposition method (PVD method) such as a vacuum vapor deposition method, a sputtering method, and an ion plating method, or a chemical vapor deposition method (CVD method) such as a plasma chemical vapor deposition method, a thermochemical vapor deposition method, and a photochemical vapor deposition method.

The organic coating layer can be formed by applying a coating agent including the above gas barrier composition and curing the applied coating agent by heating. The coating agent is prepared by adding a solvent or the like to the gas barrier composition such that the desired gas barrier property, thickness, viscosity, or the like can be obtained. Examples of the method for applying the coating agent include an application method of roll coating, gravure coating, knife coating, dip coating, spray coating, or another coating method.

(2) Primer Layer Formation Step

A primer layer is formed on the barrier layer. The primer layer can be formed by applying a coating agent including the above polyurethane-based resin composition and curing the applied coating agent by heating. The coating agent is prepared by adding a solvent or the like to the gas barrier composition such that the desired P2/P1 ratio, P3 area ratio, thickness, viscosity, or the like can be obtained. The content of the polyfunctional isocyanate in the polyurethane-based resin composition is blended such that the NCO/OH ratio is 1.0 to 3.0. Examples of the method for applying the coating agent include an application method of roll coating, gravure coating, knife coating, dip coating, spray coating, or another coating method.

When the base material layer is formed by laminating a plurality of base materials as shown in FIG. 1, the method for producing the barrier film of the present disclosure further includes (3) an adhesion step after the primer layer formation step (2).

(3) Adhesion Step

In the adhesion step, the surface of the opposite side of the first base material from the barrier layer and the second base material are laminated via an adhesion layer.

Specifically, the above adhesive is applied to the surface of the first base material, the second base material is overlapped, and the adhesion layer is cured. Alternatively, a coating agent including a crosslinking agent and a resin is applied to the surface of the first base material, then the second base material is overlapped, and the coating agent is crosslinked by heat or the like. The method for applying an adhesive or a coating agent can be applied by roll coating, gravure coating, knife coating, dip coating, spray coating, another coating method, a printing method, or the like.

Alternatively, a melted thermoplastic resin may be caused to flow between the first base material and the second base material by extrusion lamination, and then cooled to form an adhesion layer.

When a diffusion layer is provided as shown in FIG. 1, the diffusion layer is preferably formed in advance on the base material layer or the second base material.

Specifically, a coating agent including a resin, a filler, a solvent, and the like can be applied to the surface of the opposite side of the base material layer or the second base material from the surface on which the barrier layer is provided, and cured to form the diffusion layer. Examples of the method for applying the coating agent include an application method of roll coating, gravure coating, knife coating, dip coating, spray coating, or another coating method.

[Applications of Barrier Film]

The barrier film according to the present disclosure can be used, for example, as a barrier film for a wavelength conversion sheet of a surface light source. Examples of the surface light source include a backlight light source of a liquid crystal display device and a backlight light source of an inspection device. That is, the barrier film according to the present disclosure can be used as a "barrier film for a wavelength conversion sheet of a backlight light source of a liquid crystal display device," a "barrier film for a wavelength conversion sheet of a backlight light source of an inspection device," or the like.

Further, the barrier film according to the present disclosure can also be used as a "barrier film for a wavelength conversion sheet for horticulture." Examples of the wavelength conversion sheet for horticulture include a sheet having the function of converting an ultraviolet ray into a wavelength suitable for plant growth. Examples of the wavelength suitable for plant growth include a wavelength suitable for photosynthesis. The wavelength conversion sheet for horticulture can be installed, for example, on a ceiling or the like of a horticultural facility such as a plastic greenhouse and a glasshouse.

[Wavelength Conversion Sheet]

Figure 2:
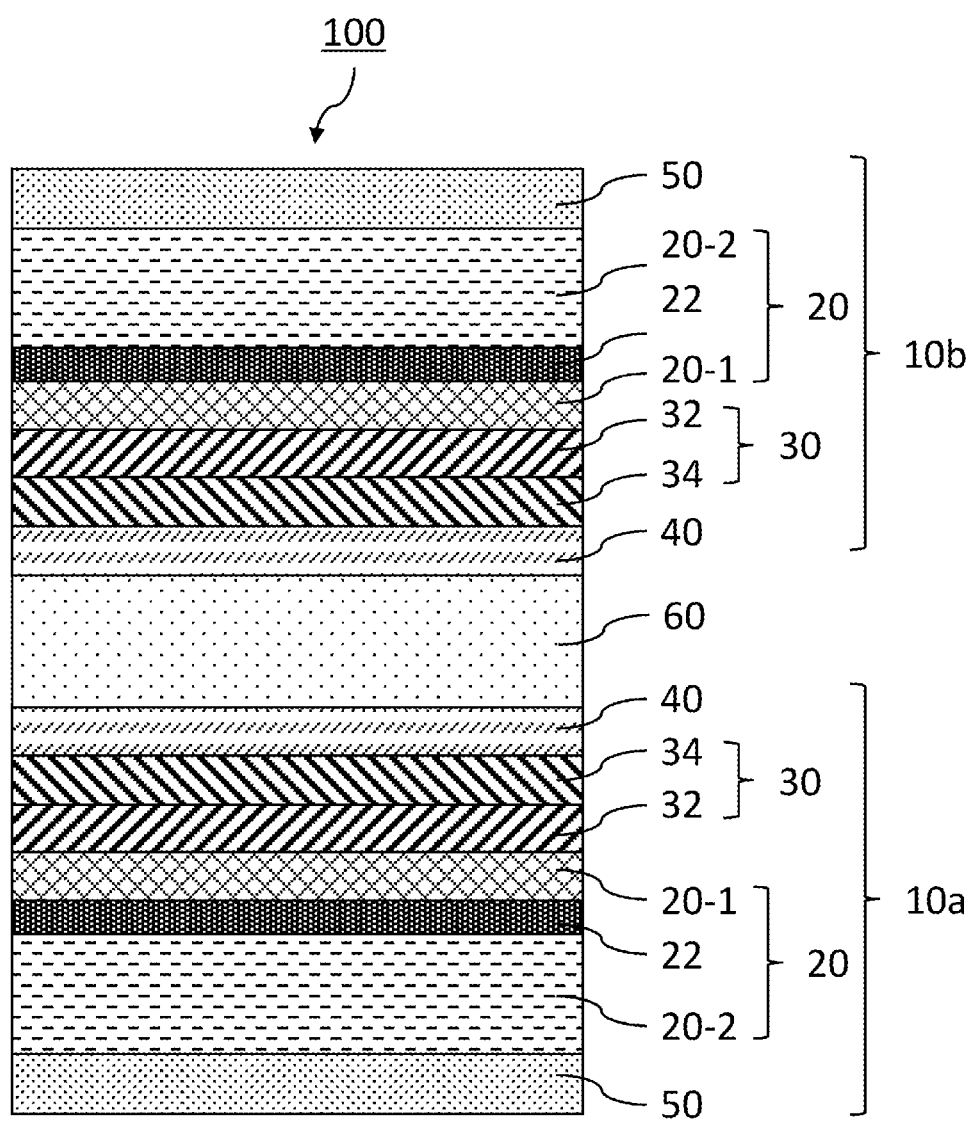
FIG. 2 is a cross-sectional schematic view schematically illustrating one embodiment of the wavelength conversion sheet of the present disclosure.

FIG. 2 is a cross-sectional schematic view schematically illustrating one embodiment of the wavelength conversion sheet of the present disclosure. A wavelength conversion sheet 100 of FIG. 2 includes barrier films 10 (10a and 10b) described above on both the surfaces, respectively, of a phosphor layer 60. The barrier film 10 of the present disclosure may be provided on at least one surface side of the phosphor layer 60. Namely, the barrier film 10 (10a) of the present disclosure is provided on one surface side of the phosphor layer 60, and another barrier film other than the barrier film of the present disclosure described above may be provided on the other surface side of the phosphor layer 60.

[Phosphor Layer]

The phosphor layer is a layer for adjusting the emission wavelength of light emitted from a backlight source. The phosphor layer can be formed by laminating a sealing resin containing a phosphor. For example, the phosphor layer can be formed by applying a liquid mixture containing a phosphor and a sealing resin to a surface of a base material layer and curing the applied liquid mixture. The phosphor layer contains one or two or more phosphors formed of a quantum dot.

The quantum dot forming the phosphor is a semiconductor particle of a predetermined size having the quantum confinement effect. When a quantum dot absorbs light from an excitation source and reaches an energy excited state, the quantum dot emits energy corresponding to an energy bandgap of the quantum dot. By regulating the size of the quantum dot or the composition of the substance, the energy bandgap can be regulated, and energy of wavelength bands at various levels can be obtained. In particular, the quantum dot can generate strong fluorescence in a narrow wavelength band. Therefore, the display device can be illuminated with light of the three primary colors having excellent color purity, and thereby the display device can have excellent color reproducibility.

The quantum dot preferably includes a quantum dot that emits secondary light having a wavelength corresponding to red, a quantum dot that emits secondary light having a wavelength corresponding to green, and a combination thereof. The quantum dot may contain a quantum dot other than the quantum dot that emits secondary light having a wavelength corresponding to red and the quantum dot that emits secondary light having a wavelength corresponding to green.

The core of the quantum dot is not particularly limited as long as it is a nanometer-sized fine particle of a semiconductor and is a material that generates the quantum confinement effect (quantum size effect). Examples of the quantum dot include a semiconductor fine particle whose emission color is regulated by its own particle size and a semiconductor fine particle having a dopant.

Specific examples of a material that forms the core include a semiconductor crystal containing a semiconductor compound or a semiconductor such as a group II-VI semiconductor compound such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe; a group III-V semiconductor compound such as AlN, AlP, AlAs, AlSb, GaAs, GaP, GaN, GaSb, InN, InAs, InP, InSb, TiN, TiP, TiAs, and TiSb; or a group IV semiconductor such as Si, Ge, and Pb. A semiconductor crystal including a semiconductor compound including three or more elements such as InGaP can also be used.

Further, as a quantum dot composed of a semiconductor fine particle having a dopant, a semiconductor crystal can be used that is formed by doping the above semiconductor compound with a cation of a rare earth metal or a cation of a transition metal, such as $Eu^{3+}$, $Tb^{3+}$, $Ag^+$, or $Cu^+$.

A semiconductor crystal such as CdS, CdSe, CdTe, InP, or InGaP is suitable as a material that forms the core of the quantum dot in view of ease of preparation, controllability of particle size that can provide light emission in the visible range, and fluorescence quantum yield.

The quantum dot may be made of one semiconductor compound or two or more semiconductor compounds. For example, the quantum dot may have a structure (core-shell structure) in which the core as a light emitting portion is covered with a protective layer (shell).

When the core-shell type quantum dot is used, a material having a bandgap higher than that of the semiconductor compound that forms the core can be used as the semiconductor that forms the shell so that an exciton is confined in the core, whereby the light emission efficiency of the quantum dot can be enhanced.

Examples of the core-shell structure (core/shell) having such a bandgap magnitude relationship include CdSe/ZnS, CdSe/ZnSe, CdSe/CdS, CdTe/CdS, InP/ZnS, Gap/ZnS, Si/ZnS, InN/GaN, InP/CdSSe, InP/ZnSeTe, InGaP/ZnSe, InGaP/ZnS, Si/AlP, InP/ZnSTe, InGaP/ZnSTe, and InGaP/ZnSSe.

The size of the quantum dot may be appropriately controlled by the material that constitutes the quantum dot so that light having a desired wavelength can be obtained. As the particle size of the quantum dot decreases, the energy bandgap increases. Specifically, as the crystal size decreases, the light emission of the quantum dot shifts to the blue side, that is, to the high energy side.

In general, the particle size (diameter) of the quantum dot is preferably in the range of 0.5 nm to 20 nm and particularly preferably in the range of 1 nm to 10 nm. A narrower size distribution of the quantum dot can provide a clearer emission color.

The shape of the quantum dot is not particularly limited, and may be, for example, a spherical shape, a rod shape, a disk shape, or any other shape. When the particle dot is not in a spherical shape, the particle size of the quantum dot can be a value of a truly spherical shape having the same volume.

The quantum dot may be coated with a resin.

The content of the quantum dot is appropriately adjusted according to the thickness of the phosphor layer, the recycling rate of light in the backlight, the target color, or the like. If the thickness of the phosphor layer is in the range described later, the content of the quantum dot is about 0.01 to 1.0 part by mass per 100 parts by mass of the sealing resin of the phosphor layer.

Examples of the sealing resin of the phosphor layer include a thermoplastic resin, a cured product of a thermosetting resin composition, and a cured product of an ionizing radiation curable resin composition. Among these, in view of durability, a cured product of a thermosetting resin composition and a cured product of an ionizing radiation curable resin composition are preferable, and a cured product of an ionizing radiation curable resin composition is more preferable.

The thermoplastic resin composition is a composition obtained by adding a crosslinking agent or the like to a thermoplastic resin. Examples of the thermoplastic resin include EVA, an ionomer, polyvinyl butyral (PVB), and a polyethylene-based resin. These may be used singly or as a mixture of one or more.

The thermosetting resin composition is a composition including at least a thermosetting resin, and is a resin composition that is cured by heating. Examples of the thermosetting resin include an acrylic resin, a urethane resin, a phenol resin, a urea melamine resin, an epoxy resin, an unsaturated polyester resin, and a silicone resin. These may be used singly or as a mixture of one or more. In the thermosetting resin composition, a curing agent is added, as necessary, to these curable resins.

The ionizing radiation curable resin composition is a composition including a compound having an ionizing radiation curable functional group (hereinafter, also referred to as an "ionizing radiation curable compound").

Examples of the ionizing radiation curable functional group include an ethylenically unsaturated bond group such as a (meth)acryloyl group, a vinyl group, or an allyl group, an epoxy group, and an oxetanyl group, and among these, an ethylenically unsaturated bond group is preferable. Among the ethylenically unsaturated bond groups, a (meth)acrylate group is preferable. Hereinafter, the ionizing radiation curable compound having a (meth)acryloyl group is referred to as a (meth)acrylate-based compound. That is, the sealing resin preferably includes a cured product of a composition including a (meth)acrylate-based compound.

As used herein, "(meth)acrylate" refers to methacrylate and acrylate. As used herein, "ionizing radiation" means an electromagnetic wave or a charged particle beam having an energy quantum that can polymerize or crosslink a molecule among electromagnetic waves or a charged particle beams. An ultraviolet ray (UV) or an electron beam (EB) is usually used, and an electromagnetic wave such as an X-ray or a y-ray, and a charged particle beam such as an α-ray or an ion beam can also be used.

The ionizing radiation curable compound may be a monofunctional ionizing radiation curable compound having only one such functional group, a polyfunctional ionizing radiation curable compound having two or more such functional groups, or a mixture thereof. Among these, a polyfunctional ionizing radiation curable compound is preferable, and a polyfunctional (meth)acrylate-based compound having two or more (meth)acryloyl groups is more preferable. That is, the sealing resin includes preferably a cured product of a polyfunctional ionizing radiation curable compound and more preferably a cured product of a polyfunctional (meth) acrylate-based compound.

The polyfunctional (meth)acrylate-based compound may have an alkyleneoxy group.

As the alkyleneoxy group, for example, an alkyleneoxy group having 2 to 4 carbon atoms is preferable, an alkyleneoxy group having 2 or 3 carbon atoms is more preferable, and an alkyleneoxy group having 2 carbon atoms is further preferable.

The polyfunctional (meth)acrylate-based compound having an alkyleneoxy group may be a polyfunctional (meth) acrylate-based compound having a polyalkyleneoxy group including a plurality of alkyleneoxy groups.

When the polyfunctional (meth)acrylate-based compound has an alkyleneoxy group, the number of alkyleneoxy groups in one molecule is preferably 2 to 30, and more preferably 2 to 20, further preferably 3 to 10, and more further preferably 3 to 5.

When the polyfunctional (meth)acrylate-based compound has an alkyleneoxy group, the compound preferably has a bisphenol structure. This tends to improve the heat resistance of the cured product. Examples of the bisphenol structure include a bisphenol A structure and a bisphenol F structure, and among these, a bisphenol A structure is preferable.

As the polyfunctional (meth)acrylate-based compound having an alkyleneoxy group, above all, ethoxylated bisphenol A type di(meth)acrylate, propoxylated bisphenol A type di(meth)acrylate, and propoxylated ethoxylated bisphenol A type di(meth)acrylate are preferable, and ethoxylated bisphenol A type di(meth)acrylate is more preferable.

The ionizing radiation curable compound may be a monomer, an oligomer, a low molecular weight polymer, or a mixture thereof.

When the ionizing radiation curable compound is an ultraviolet curable compound, the ionizing radiation curable composition preferably includes an additive such as a photopolymerization initiator or a photopolymerization accelerator.

The phosphor layer may include an internal diffusion particle.

As the internal diffusion particle, either of an organic particle and an inorganic particle can be used. Examples of the organic particle include a particle made of polymethyl methacrylate, an acrylic-styrene copolymer, a melamine resin, a polycarbonate, a polystyrene, polyvinyl chloride, a benzoguanamine-melamine-formaldehyde condensate, a silicone resin, a fluororesin, a polyester, or the like. Examples of the inorganic fine particle include a fine particle made of silica, alumina, zirconia, titania, or the like.

Examples of the shape of the internal diffusion particle include a spherical shape, a disk shape, a rugby ball shape, and an irregular shape. The internal diffusion particle may be any of a hollow particle, a porous particle, and a solid particle.

The content of the internal diffusion particle is preferably 1 part by mass or more and 40 parts by mass or less and more preferably 3 parts by mass or more and 30 parts by mass or less per 100 parts by mass of the sealing resin.

The average particle size of the internal diffusion particle is preferably 1 μm or more and 7 μm or less and more preferably 1 μm or more and 3 μm or less.

The thickness of the phosphor layer is preferably 10 μm or more and 200 μm or less, more preferably 20 μm or more and 150 μm or less, and further preferably 30 μm or more and 130 μm or less.

The refractive index $n_z$ of the phosphor layer is preferably 1.40 or more and 1.55 or less, more preferably 1.43 or more and 1.52 or less, and further preferably 1.46 or more and 1.50 or less.

The refractive index $n_z$ of the phosphor layer is mostly governed by the refractive index of the sealing resin. The reason for this is as follows: the phosphor layer has a low quantum dot content, and even if an internal diffusion agent is contained, the internal diffusion agent has a particle size larger than the wavelength of light and does not affect the refractive index of the layer.

[Method for Producing Wavelength Conversion Sheet]

The wavelength conversion sheet of the present disclosure can be produced by using at least one barrier film produced by the method for producing the barrier film described above. In the following, a method for producing a wavelength conversion sheet having a configuration in which a phosphor layer is sandwiched between the barrier films of the present disclosure, as shown in FIG. 2, will be given as an example.

Specifically, a liquid mixture (ink) including a phosphor and a sealing resin is applied to a surface of the primer layer of one barrier film of the present disclosure. Examples of the method for applying the liquid mixture (ink) include an application method of roll coating, gravure coating, knife coating, dip coating, spray coating, or another coating method.

Then, the phosphor layer is contacted with the primer layer of another barrier film of the present disclosure. After that, the liquid mixture (ink) is cured by heat or the like to obtain a wavelength conversion sheet.

[Backlight]

The backlight of the present disclosure is a backlight including at least one light source that emits primary light, an optical plate that is disposed adjacent to the light source and is for light guiding or diffusion, and a wavelength conversion sheet (quantum dot sheet) disposed on a light emission side of the optical plate, wherein the wavelength conversion sheet is the wavelength conversion sheet of the present disclosure described above.

Figure 3:
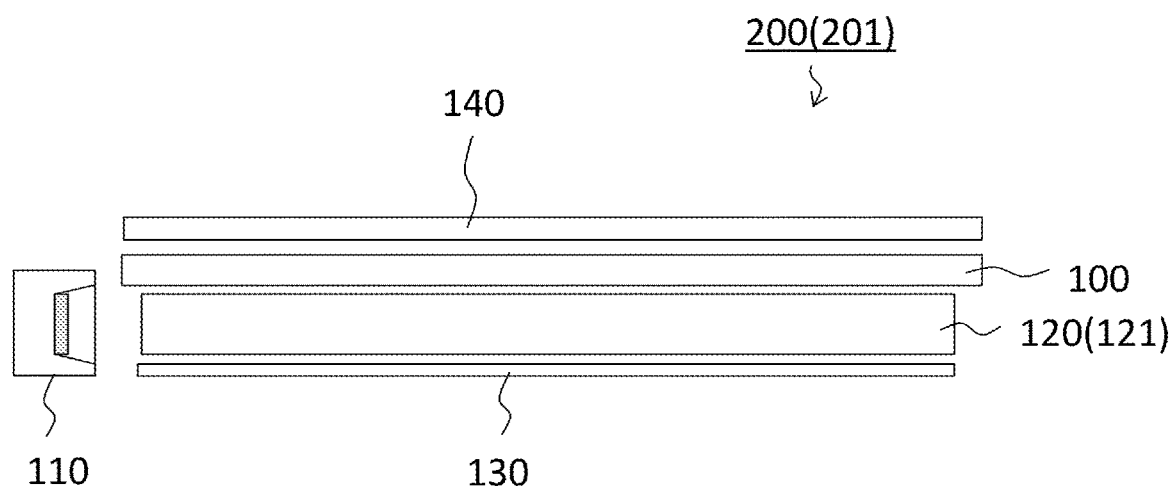
FIG. 3 is a cross-sectional view showing one embodiment of the backlight of the present disclosure.
Figure 4:
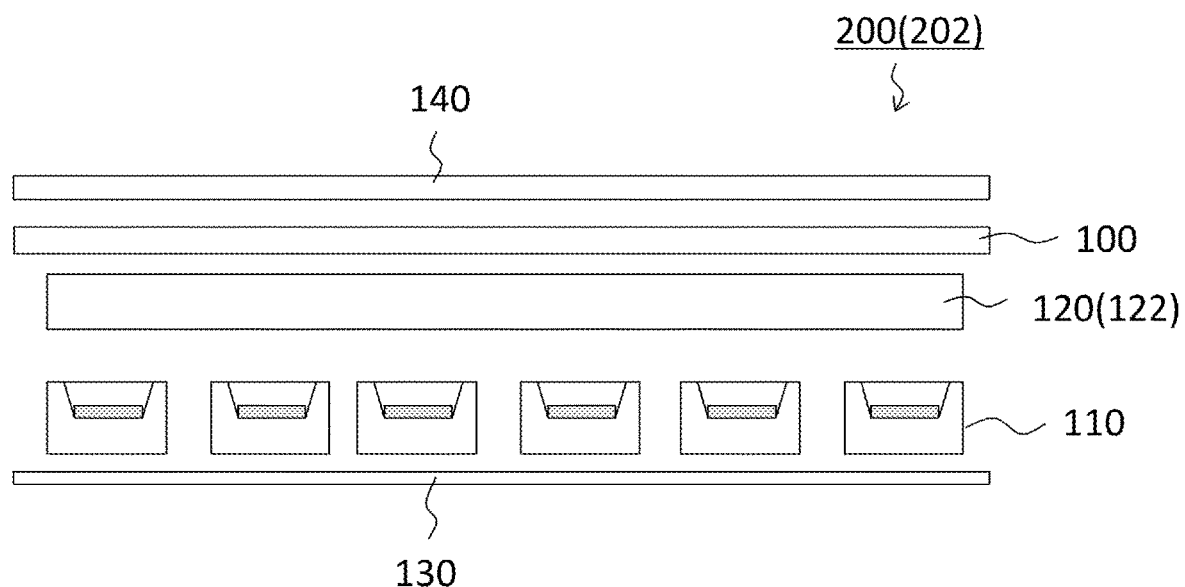
FIG. 4 is a cross-sectional view showing another embodiment of the backlight of the present disclosure.

As a backlight 200 of the present disclosure, either the edge-lit type backlight shown in FIG. 3 or the direct-lit type backlight shown in FIG. 4 can be adopted.

An optical plate 120 used for the edge-lit type backlight 201 in FIG. 3 is an optical member for guiding primary light emitted by a light source 110, and is a so-called light guide plate 121. The light guide plate 121 has, for example, a substantially flat plate shape configured to have at least one surface as a light coming-in surface and one surface substantially orthogonal to the light coming-in surface as a light emission surface.

The light guide plate is mainly made of a matrix resin selected from the group consisting of a highly transparent resin such as polymethyl methacrylate. A resin particle having a refractive index different from that of the matrix resin may be added, as necessary, to the light guide plate. Each surface of the light guide plate may have a complicated surface shape instead of a uniform flat surface, and may be provided with a dot pattern or the like.

The optical plate 120 used for the direct-lit type backlight 202 of FIG. 4 is an optical member (light diffusing material 122) having a light diffusing property for making the pattern of the light source 110 less visible. Examples of the light diffusing material 122 include a milky white resin plate having a thickness of about 1 to 3 mm.

In addition to the light source, the optical plate, and the wavelength conversion sheet described above, the edge-lit type and direct-lit type backlights may include one or more members selected from a reflector, a light diffusing film, a prism sheet, a brightness enhancement film (BEF), a reflective polarizing film (DBEF), and the like, depending on the purpose. The reflector is disposed on the opposite side of the optical plate from the light emission surface side. The light diffusing film, the prism sheet, the brightness enhancement film, and the reflective polarizing film are disposed on the light emission surface side of the optical plate. A backlight having an excellent balance of front brightness, viewing angle, and the like can be provided when the backlight is configured to include one or more members selected from the group consisting of a reflector, a light diffusing film, a prism sheet, a brightness enhancement film, a reflective polarizing film, and the like.

In the edge-lit type and direct-lit type backlights, the light source 110 is a light emitting body that emits primary light, and it is preferable to use a light emitting body that emits primary light having a wavelength corresponding to blue. The primary light having a wavelength corresponding to blue preferably has a peak wavelength in the range of 380 to 480 nm. The peak wavelength is more preferably 450 nm±7 nm, more preferably 450 nm±5 nm, more preferably 450 nm±3 nm, and more preferably 450 nm±1 nm.

The light source 110 is preferably an LED light source and more preferably a blue monochromatic LED light source, in view of simplifying and downsizing the apparatus in which the backlight is installed. Alternatively, a red phosphor may be applied onto a blue monochromatic LED light source to provide a light source that exhibits a blue color and a red color. The number of the light source 110 is at least one, and it is preferable to provide a plurality thereof, in view of emitting sufficient primary light.

[Display Device]

Examples of the display device include a liquid crystal display device. The liquid crystal display device includes a backlight and a liquid crystal panel. The backlight is the backlight of the present disclosure described above.

The liquid crystal panel is not particularly limited, and a general-purpose liquid crystal panel can be used as the liquid crystal panel of the liquid crystal display device. For example, a liquid crystal panel having a general structure can be used in which the liquid crystal layer is sandwiched between glass plates on the upper side and the lower side, respectively, thereof, specifically, a liquid crystal panel using a display mode such as TN, STN, VA, IPS, and OCB.

The liquid crystal display device further includes a polarizing plate, a color filter, and the like. A general-purpose polarizing plate and color filter can be used.

The wavelength conversion sheet of the present disclosure has particularly excellent close adhesion between the barrier film and the phosphor layer. Therefore, when the wavelength conversion sheet of the present disclosure is applied to a display device (liquid crystal display device), degradation of the phosphor layer due to the invasion thereof by water vapor or oxygen from the external environment can be effectively suppressed. As a result, a display device including a backlight light source having excellent environmental stability can be obtained.

EXAMPLES

Hereinafter, the present disclosure will be specifically described with reference to Examples and Comparative Examples. The present disclosure is not limited to the embodiments described in the Examples.

1. Evaluations and Measurements

The barrier film and the wavelength conversion sheet produced by the following production methods were subjected to the following measurements and evaluations. Results are shown in Table 1. Unless otherwise specified and unless the test was carried out in a specific environment, the atmosphere at the time of each measurement and evaluation was a temperature of 23±5° C. and a relative humidity of 40 to 65%, and before the start of each measurement and evaluation, the target sample was exposed to the above atmosphere for 30 minutes or more and then the measurement and evaluation were carried out.

1-1. XPS Analysis

A measurement piece was cut out from the barrier film. Using an X-ray photoelectron spectroscopy analyzer, the X-ray photoelectron spectrum of the surface of the primer layer of each measurement piece was measured under the conditions described below.

Figure 5:
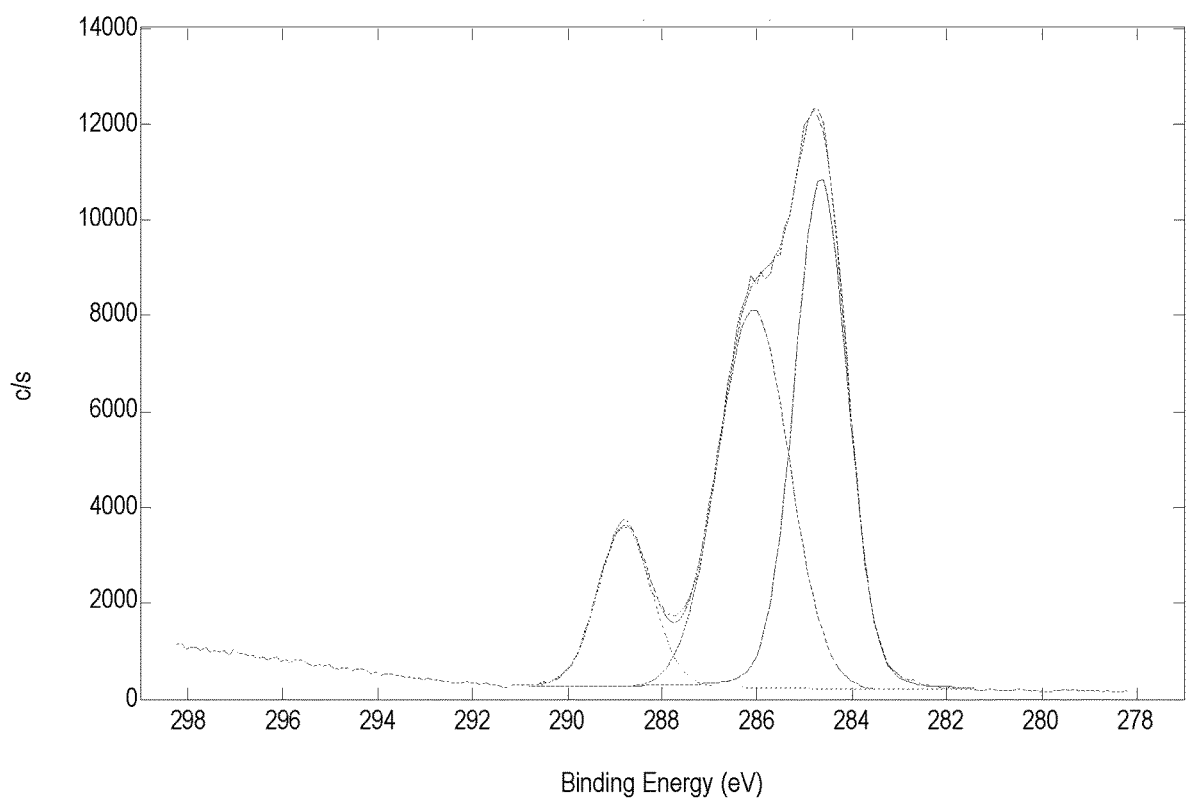
FIG. 5 is a C is spectrum and peak separation results for the surface of the primer layer of Example 1.

<Measurement>
Apparatus: PHI 5000 VersaProbe III manufactured by ULVAC-PHI, Inc.
X-ray source: AlKα
X-ray output: 50 W
Emission current: 3.3 mA
Acceleration voltage: 15 kV
Measurement region: 600 μm×300 μm For a C1s spectrum, peak separation was carried out for a C—C bond, a C—O bond, and an O—C=O bond. As a representative, the C1s spectrum and peak separation results for Example 1 are shown in FIG. 5. FIG. 5 shows three peaks observed in the C1s spectrum and results of carrying out peak separation with the peak near 284.1 to 285.1 eV as a signal assigned to the C—C bond, the peak near 286.0 to 286.8 eV as a signal assigned to the C—O bond, and the peak near 288.0 to 289.2 eV as a signal assigned to the C=O bond.

The peak area P1 of the C—C bond, the peak area P2 of the C—O bond, and the peak area P3 of the O—C=O bond were calculated, and the ratio of each peak area to the sum of P1, P2, and P3 (peak area ratio) was calculated. Further, P2/P1 was determined. The ratios of P1, P2, and P3, and P2/P1 are shown in Table 1.

The elements included in the primer layer were identified from the X-ray photoelectron spectrum, and the spectral area for each of the elements was multiplied by a relative sensitivity factor thereof to calculate the total spectral area. Then, the content of the C—N bond to all chemical bond species was calculated from the ratio of the area of the C—N bond peak of an N1s spectrum to the total spectral area. Results are shown in Table 1.

1-2. Close Adhesion

A wavelength conversion sheet was cut out to a size of 25 mm×150 mm to prepare a test piece. A peeling test was carried out using a desktop material tester (STA-1150, manufactured by Takachiho-Seiki Co., Ltd.) under conditions of a tension speed of 300 mm/min, a peeling direction of 180°, and a distance between chucks of 15 mm in a temperature environment of 23° C., and the peel strength between the barrier film and the phosphor layer was measured for each test piece. Results are shown in Table 1.

1-3. Wetting Index

A plurality of wetting index standard solutions (manufactured by Pacific Chemical Co., Ltd., trade name "Tension Checker") each having a different surface tension were each applied onto the primer layers of the Examples and the Comparative Examples, and the presence or absence of breakage of the liquid film or shrinkage of the entire liquid film was checked after about 3 seconds. The largest value among the values of the surface tension of the wetting index standard solutions that were able to be applied onto the primer layer without causing breakage or shrinkage of the liquid film was defined as the wetting index of the primer layer. Results are shown in Table 1.

2. Preparation of Sample 2-1. Preparation of Barrier Film

Example 1

As a first base material, an aluminum oxide thin film (AlO$_x$, target thickness: 8 nm) was vapor-deposited on a PET film (thickness: 12 μm) by a vacuum vapor deposition method to form an inorganic oxide thin film layer.

Tetraethoxysilane was mixed into a solution (pH 2.2) obtained by mixing water, isopropyl alcohol, and 0.5 N hydrochloric acid, while cooling the solution to 10° C., to thereby prepare solution A. Separately, polyvinyl alcohol having a saponification value of 99% or more and isopropyl alcohol were mixed to thereby prepare solution B. Solution A and solution B were mixed to prepare a coating liquid for organic coating layer formation (solid content: 5%).

Next, the coating liquid for organic coating layer formation was applied onto the inorganic oxide thin film layer by gravure printing and heat-treated at 180° C. for 60 seconds to form an organic coating layer having a thickness of 180 nm.

Next, a coating liquid for primer layer formation having the following formulation was prepared such that the NCO/OH ratio was 1.4.

| | |
|---|---|
| Polyester polyurethane polyol (hydroxyl value: 62 mgKOH/g, solid content: 20%) | 50 parts by mass |
| Silane coupling agent (3-glycidoxypropylmethyl-dimethoxysilane) | 1 part by mass |
| Silica filler (average particle size of 5 μm) | 8 parts by mass |
| Curing agent (1,6-hexamethylene diisocyanate, solid content of 35%) | 1 part by mass |
| Solvent (MEK) | 50 parts by mass |

Next, the coating liquid for primer layer formation was applied onto the organic coating layer and dried at 80° C. for 60 seconds to form a primer layer having a thickness of 0.4 μm.

A urethane-based adhesive (manufactured by Rock Paint Co., Ltd., trade name "RU-004, H-1") was applied, by gravure printing, onto the surface of the opposite side of the first base material from the surface on which the inorganic oxide thin film layer to the primer layer were formed, and dried to form an adhesion layer having a thickness of 4 μm. Next, a PET film (thickness: 100 μm) was disposed as a second base material on the adhesion layer side of the first base material, and the first base material and the second base material were bonded together under conditions of nip pressure: 0.2 MPa and line speed: 50 m/min to prepare a barrier film of Example 1.

Example 2

A barrier film of Example 2 was prepared in the same step as in Example 1 except that a coating liquid for primer layer formation having the following formulation was used such that the NCO/OH ratio was 1.5.

| | |
|---|---|
| Polyester polyurethane polyol (hydroxyl value: 42 mgKOH/g, solid content: 20%) | 50 parts by mass |
| Silane coupling agent (3-glycidoxypropylmethyl-dimethoxysilane) | 1 part by mass |
| Silica filler (average particle size of 5 μm) | 1 part by mass |
| Curing agent (1,6-hexamethylene diisocyanate, solid content of 35%) | 6 parts by mass |
| Solvent (MEK) | 50 parts by mass |

Example 3

A barrier film of Example 3 was prepared in the same step as in Example 1 except that a coating liquid for primer layer formation having the following formulation was used such that the NCO/OH ratio was 1.3.

| | |
|---|---|
| Polyester polyurethane polyol (hydroxyl value: 50 mgKOH/g, solid content: 20%) | 50 parts by mass |
| Silane coupling agent (3-glycidoxypropylmethyl-dimethoxysilane) | 1 part by mass |
| Silica filler (average particle size of 5 μm) | 1 part by mass |
| Curing agent (1,6-hexamethylene diisocyanate, solid content of 35%) | 6 parts by mass |
| Solvent (MEK) | 50 parts by mass |

Example 4

A barrier film of Example 4 was prepared in the same step as in Example 1 except that a coating liquid for primer layer formation having the following formulation was used such that the NCO/OH ratio was 1.2.

| | |
|---|---|
| Polyester polyurethane polyol (hydroxyl value: 52 mgKOH/g, solid content: 20%) | 50 parts by mass |
| Silane coupling agent (3-glycidoxypropylmethyl-dimethoxysilane) | 1 part by mass |
| Silica filler (average particle size of 5 μm) | 1 part by mass |
| Curing agent (1,3-xylylene diisocyanate, solid content of 35%) | 5 parts by mass |
| Solvent (MEK) | 50 parts by mass |

Comparative Example 1

A barrier film of Comparative Example 1 was prepared in the same step as in Example 1 except that a coating liquid for primer layer formation having the following formulation was used such that the NCO/OH ratio was 1.0.

| | |
|---|---|
| Polyester polyurethane polyol (hydroxyl value: 33 mgKOH/g, solid content: 20%) | 50 parts by mass |
| Silane coupling agent (3-glycidoxypropylmethyl-dimethoxysilane) | 1 part by mass |
| Silica filler (average particle size of 5 μm) | 1 part by mass |
| Curing agent (1,3-xylylene diisocyanate, solid content of 35%) | 3 parts by mass |
| Solvent (MEK) | 50 parts by mass |

Comparative Example 2

A barrier film of Comparative Example 2 was prepared in the same step as in Example 1 except that a coating liquid for primer layer formation having the following formulation was used such that the NCO/OH ratio was 0.8.

| Polyester polyurethane polyol (hydroxyl value: 38 mgKOH/g, solid content: 20%) | 50 parts by mass |
| --- | --- |
| Silane coupling agent (3-glycidoxypropylmethyl-dimethoxysilane) | 1 part by mass |
| Silica filler (average particle size of 5 μm) | 1 part by mass |
| Curing agent (1,6-hexamethylene diisocyanate, solid content of 35%) | 3 parts by mass |
| Solvent (MEK) | 50 parts by mass |

Comparative Example 3

A barrier film of Comparative Example 3 was prepared in the same step as in Example 1 except that a coating liquid for primer layer formation having the following formulation was used such that the NCO/OH ratio was 0.7.

Polyester polyurethane polyol (hydroxyl value: 29 mgKOH/g, solid content:

| Polyester polyurethane polyol (hydroxyl value: 29 mgKOH/g, solid content: 20%) | 50 parts by mass |
| --- | --- |
| Silane coupling agent (3-glycidoxypropylmethyl-dimethoxysilane) | 1 part by mass |
| Silica filler (average particle size of 5 μm) | 1 part by mass |
| Curing agent (1,6-hexamethylene diisocyanate, solid content of 35%) | 2 parts by mass |
| Solvent (MEK) | 50 parts by mass |

Comparative Example 4

A barrier film of Comparative Example 4 was prepared in the same step as in Example 1 except that a coating liquid for primer layer formation having the following formulation was used such that the NCO/OH ratio was 0.9.

| Polyester polyurethane polyol (hydroxyl value: 35 mgKOH/g, solid content: 20%) | 50 parts by mass |
| --- | --- |
| Silane coupling agent (3-glycidoxypropylmethyl-dimethoxysilane) | 1 part by mass |
| Silica filler (average particle size of 5 μm) | 1 part by mass |
| Curing agent (1,6-hexamethylene diisocyanate, solid content of 35%) | 3 parts by mass |
| Solvent (MEK) | 50 parts by mass |

Comparative Example 5

A barrier film of Comparative Example 5 was prepared in the same step as in Example 1 except that a coating liquid for primer layer formation having the following formulation was used. No curing agent was added to the coating liquid of Comparative Example 5. That is, the NCO/OH ratio of Comparative Example 5 is 0.

| Polyester polyurethane polyol (hydroxyl value: 32 mgKOH/g, solid content: 20%) | 50 parts by mass |
| --- | --- |
| Silane coupling agent (3-glycidoxypropylmethyl-dimethoxysilane) | 1 part by mass |
| Silica filler (average particle size of 5 μm) | 1 part by mass |
| Solvent (MEK) | 50 parts by mass |

The amount of the coating liquid for primer layer formation applied for each of Examples 1 to 4 and Comparative Examples 1 to 5 is shown in Table 1.

2-2. Preparation of Wavelength Conversion Sheet

A sealing resin (ionizing radiation curable urethane acrylate-based resin) was mixed into a phosphor (quantum dot having an average particle size of 3 to 5 nm) having a core made of cadmium selenide (CdSe) and a shell made of zinc sulfide (ZnS) such that the amount of the phosphor was 1 part by mass per 100 parts by mass of the sealing resin, to prepare a liquid mixture (ink) for phosphor layer formation.

The ink was applied onto the primer layer of the barrier film of each of the Examples and the Comparative Examples in such a way as to have a thickness of 100 μm (after drying) to form a phosphor layer.

Wavelength conversion sheets of Examples 1 to 4 and Comparative Examples 1 to 5 were prepared by laminating their respective barrier films of the Examples and the Comparative Examples, which were each the same as the barrier film to which the above ink was applied, on the above phosphor layer such that the primer layer was in contact with the phosphor layer, followed by UV-curing lamination.

3. Results

TABLE 1

| | Amount applied (g/m²) | Ratio of peak area | | | P2/P1 | Hydroxyl value (mgKOH/g) | C—N bond content (%) | Peel strength (N/25 mm) | Wetting index (dyne/cm) |
| --- | --- | --- | --- | --- | --- | --- | --- | --- | --- |
| | | P1 (C—C) | P2 (C—O) | P3 (O—C=O) | | | | | |
| Example 1 | 1.16 | 0.44 | 0.42 | 0.14 | 0.96 | 62 | 1.41 | 15.1 | 70 |
| Example 2 | 0.98 | 0.53 | 0.32 | 0.15 | 0.59 | 42 | 1.87 | 13.6 | 40 |
| Example 3 | 1.18 | 0.50 | 0.35 | 0.14 | 0.70 | 50 | 1.91 | 14.2 | 50 |
| Example 4 | 1.17 | 0.49 | 0.42 | 0.09 | 0.85 | 52 | 2.29 | 13.8 | 50 |
| Comparative Example 1 | 1.14 | 0.56 | 0.28 | 0.16 | 0.49 | 33 | 1.05 | 4.6 | 40 |
| Comparative Example 2 | 1.09 | 0.56 | 0.28 | 0.16 | 0.49 | 38 | 1.72 | 5.1 | 44 |
| Comparative Example 3 | 1.11 | 0.57 | 0.27 | 0.16 | 0.47 | 29 | 1.81 | 10.3 | 42 |
| Comparative Example 4 | 1.07 | 0.57 | 0.27 | 0.16 | 0.47 | 35 | 1.66 | 10.6 | 42 |
| Comparative Example 5 | 1.09 | 0.59 | 0.26 | 0.15 | 0.44 | 32 | 2.07 | 1.5 | 44 |

Figure 6:
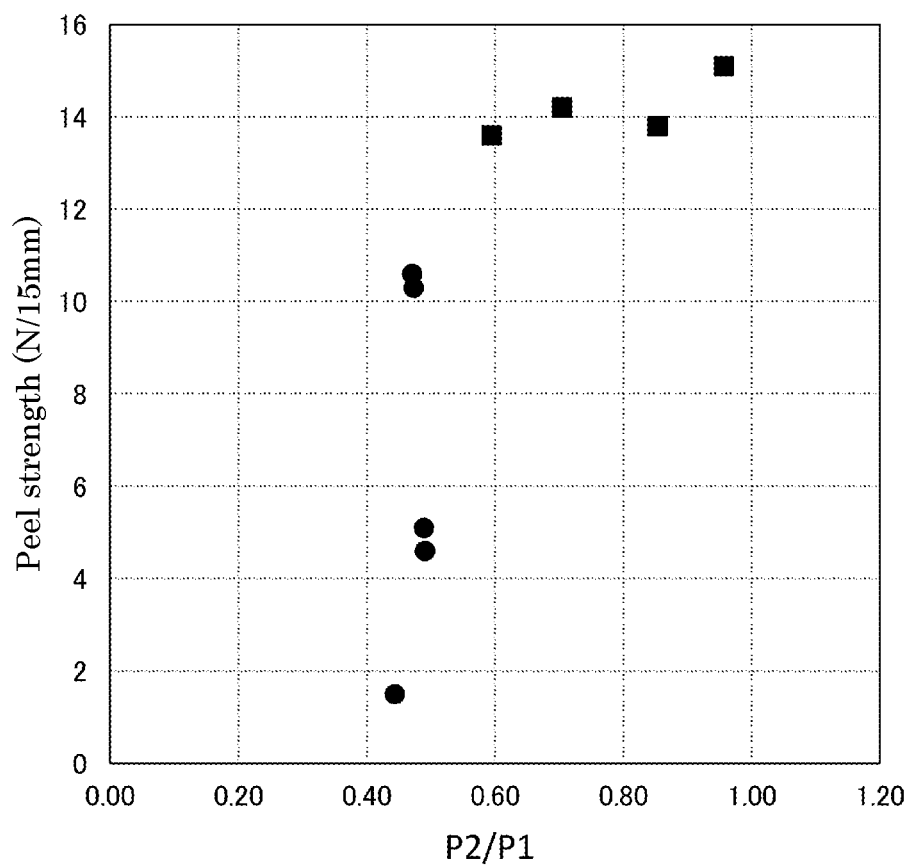
FIG. 6 is a graph showing the relationship between P2/P1 and close adhesion for each Example and Comparative Example.

FIG. 6 is a graph showing the relationship between P2/P1 and close adhesion for each Example and Comparative Example. In FIG. 6, the horizontal axis is P2/P1, and the vertical axis is the peel strength at the interface between the primer layer and the phosphor layer.

It can be read from FIG. 6 that the peel strength at the interface between the primer layer and the phosphor layer changes abruptly near a P2/P1 of 0.50. When P2/P1 was 0.55 or more, the peel strength was 13 N/25 mm or more, and the close adhesion between the primer layer and the phosphor layer was good. In addition, the hydroxyl values in the Examples were high, and it is considered that for this reason P2/P1 was high and the close adhesion was thus improved. On the other hand, as shown in Table 1, no correlation was found between the wetting index of the surface of the primer layer and the values of P2/P1. From this, it is considered that the wettability of the surface of the primer layer has little influence on the close adhesion between the primer layer and the phosphor layer.

REFERENCE SIGNS LIST

10 (10*a*, 10*b*): Barrier film
20: Base material layer
20-1: First base material
20-2: Second base material
22: Adhesive layer
30: Barrier layer
32: Inorganic oxide thin film layer
34: Organic coating layer
40: Primer layer
50: Diffusion Layer
60: Phosphor layer
100: Wavelength conversion sheet
110: Light source
120: Optical plate
121: Light guide plate
122: Diffusing plate
130: Reflector
140: Prism sheet
200: Backlight
201: Edge-lit type backlight
202: Direct-lit type backlight

The invention claimed is:

1. A barrier film for a wavelength conversion sheet, comprising: a barrier layer; and a primer layer, wherein
the primer layer is configured to adhere the barrier film to a phosphor layer including a phosphor and a sealing resin, the primer layer comprising a cured product of a polyurethane-based resin composition, and
when a surface of an opposite side of the primer layer from the barrier layer is subjected to X-ray photoelectron spectroscopy to obtain a C1s spectrum, P2/P1 is 0.55 or more, where P1 is an area of a peak assigned to a C—C bond in the C1s spectrum and P2 is an area of a peak assigned to a C—O bond in the C1s spectrum.

2. The barrier film according to claim 1, wherein the barrier layer is formed on a base material layer, and the primer layer is formed on a surface of an opposite side of the barrier layer from the base material layer.

3. The barrier film according to claim 2, wherein
the barrier layer comprises an inorganic oxide thin film layer and an organic coating layer, and
the organic coating layer is in contact with the primer layer.

4. A wavelength conversion sheet, wherein the barrier film according to claim 2 is provided on at least one surface side of a phosphor layer comprising a phosphor such that the primer layer and the phosphor layer are in contact with each other.

5. The barrier film according to claim 1, wherein
the barrier layer comprises an inorganic oxide thin film layer and an organic coating layer, and
the organic coating layer is in contact with the primer layer.

6. A wavelength conversion sheet, wherein the barrier film according to claim 5 is provided on at least one surface side of a phosphor layer comprising a phosphor such that the primer layer and the phosphor layer are in contact with each other.

7. A wavelength conversion sheet, wherein the barrier film according to claim 1 is provided on at least one surface side of a phosphor layer comprising a phosphor such that the primer layer and the phosphor layer are in contact with each other.

8. A backlight comprising: at least one light source that emits primary light; an optical plate that is disposed adjacent to the light source and is for light guiding or diffusion; and a wavelength conversion sheet disposed on a light emission side of the optical plate, wherein the wavelength conversion sheet is the wavelength conversion sheet according to claim 7.

9. A liquid crystal display device comprising: a backlight; and a liquid crystal panel, wherein the backlight is the backlight according to claim 8.

10. The barrier film according to claim 1, wherein the polyurethane-based resin composition includes a one pack or two pack polyurethane-based resin composition obtained by reacting a polyfunctional isocyanate with a polyester polyurethane polyol.

11. The barrier film according to claim 1, wherein P2/P1 is 0.55 or more and 1.0 or less.

12. The barrier film according to claim 1, wherein a NCO/OH ratio of the polyurethane-based resin composition is 1.1 or more.

* * * * *